United States Patent [19]

Beaver

[11] Patent Number: 5,895,174
[45] Date of Patent: Apr. 20, 1999

[54] BEACH REPLENISHMENT SYSTEM

[76] Inventor: George M. Beaver, 4190 Ridgewood Ave., Port Orange, Fla. 32127

[21] Appl. No.: 08/810,351

[22] Filed: Mar. 3, 1997

[51] Int. Cl.⁶ .................................................. E02B 3/04
[52] U.S. Cl. .............................. 405/30; 405/21; 405/33; 405/35
[58] Field of Search .......................... 405/16, 15, 21, 405/28–35, 77, 211, 114

[56] References Cited

U.S. PATENT DOCUMENTS

| | | | |
|---|---|---|---|
| 419,121 | 1/1890 | Henshaw | 405/32 |
| 946,585 | 1/1910 | Smith | 405/77 |
| 959,214 | 5/1910 | Goff | 405/77 |
| 1,137,049 | 4/1915 | Callahan | 405/34 |
| 1,610,341 | 12/1926 | Wells | 405/21 |
| 2,019,188 | 12/1935 | McKay | 405/211 |
| 2,080,045 | 5/1937 | Hornsby | 405/31 |
| 3,379,015 | 4/1968 | Macks | 405/33 |
| 3,386,250 | 6/1968 | Katayama | 405/29 X |
| 3,415,061 | 12/1968 | Staempfli | 405/31 X |
| 3,683,968 | 8/1972 | Budd | 405/33 |
| 3,845,630 | 11/1974 | Karnas | 405/30 |
| 3,875,750 | 4/1975 | Campbell | 405/33 |
| 4,669,913 | 6/1987 | Temple . | |
| 4,784,520 | 11/1988 | Stevens . | |
| 4,804,294 | 2/1989 | Barthel | 405/21 X |
| 4,913,595 | 4/1990 | Creter et al. | 405/32 X |
| 4,966,491 | 10/1990 | Sample . | |
| 5,022,784 | 6/1991 | DeVries et al. . | |
| 5,338,131 | 8/1994 | Bestmann . | |
| 5,405,217 | 4/1995 | Dias et al. . | |
| 5,509,755 | 4/1996 | Olsen et al. . | |

FOREIGN PATENT DOCUMENTS

| | | | |
|---|---|---|---|
| 0004011 | 1/1983 | Japan | 405/30 |
| 0586228 | 12/1977 | U.S.S.R. | 405/31 |
| 425124 | 3/1935 | United Kingdom | 405/30 |

Primary Examiner—Dennis L. Taylor
Attorney, Agent, or Firm—Paul S. Rooy

[57] ABSTRACT

A beach replenishment system comprising a plurality of barriers mutually separated by troughs. Each barrier comprises two arms mutually attached at a barrier arm angle. The intersection of the arms defines a barrier vertex. An extreme of each arm opposite the barrier vertex terminates in a barrier arm end wall. Each arm comprises a descending series of parallel terraces. Each terrace comprises a shoulder and a valley, or, in an alternate embodiment, a land separated from a shoulder by a valley. The lowermost shoulder borders a ramp which is substantially parallel to a surface upon which the barrier rests, whereby receding water is projected away from the barrier and erosion under the barrier is thus minimized. Each arm is supported by vertical and horizontal braces. Runout posts are installed opposite the troughs, and barrier posts are installed opposite each barrier. Areas between adjacent barriers may be dammed and receding water channeled through a pipe to a turbine turning a generator, which may be used to generate electricity. An alternate embodiment, a seawall, comprises a wall rigidly attached to a single terrace at a right angle. The terrace comprises a valley adjacent the wall, and a shoulder. The shoulder is bordered by a ramp, which is substantially parallel to a surface upon which the seawall rests.

18 Claims, 6 Drawing Sheets

BEACH REPLENISHMENT SYSTEM

BACKGROUND OF THE INVENTION

1. Field of the Invention

This invention relates to a system to remedy the effects of erosion, and in particular, a beach replenishment system.

2. Background of the Invention

Erosion is the process whereby earth or rock is worn away over time. This is a natural process which works slowly but surely. Over hundreds of thousands of years, mountains can be worn down until they are level with the surrounding plains. The earth's surface is constantly being changed by erosion.

The main causes of erosion are the action of the air (wind) and water. Rainfall, running water (such as exists in rivers and streams), ice and wind all wear away at earth and rock.

In a beach environment, wave action is the prime cause of beach erosion. The earth contains hundreds of thousands of miles of seacoasts which are reshaped every day by waves. These waves are caused by wind, the gravity of the sun and moon, and submarine earth tremors. Seacoasts are eroded by surging seas, and molded by the drifting sands carried by waves.

Wave power can be enormous when waves strike land. The worst coastal weather in the world is in the North Atlantic. Hydraulic engineers have measured the force of waves breaking on the Scottish coast at 6,000 pounds per square foot. At one point a sea storm tore apart a breakwater by ripping away a 800 ton concrete slab, together with the 550 ton foundation to which it was attached. A new 2,600 ton section was installed, only to be swept away by a subsequent storm.

Hurricanes are a prime cause of beach erosion in North America and the Caribbean. Recent hurricanes have caused extensive beach depletion in Florida, the Carolinas, Costa Rica, the U.S. Virgin Islands, and even Long Island, in New York State. Swimming beaches have disappeared entirely, and buildings have had their foundations washed away.

Therefore, it is a matter of urgent importance to replenish the beach in those areas which have suffered from beach depletion. Once a beach is built up again, the new sand serves as protection to the coastline against inevitable storms, is useful for recreation, and prevents buildings from being washed away by sea waves.

Existing Designs

A number of ideas have been advanced to prevent beach erosion, and to replenish beaches which have suffered from erosion depletion. U.S. Pat. Nos. 5,509,755, 4,784,520 and 4,669,913 were granted Olsen et al., Stevens, and Temple for barriers which were substantially triangular in cross-section. While these designs provided a valley behind a barrier in which to trap sand, they suffered from a number of drawbacks. None of these designs incorporated provisions to prevent sand under a barrier extreme or front from being washed away by wave action. In addition, none of these designs taught a plurality of terraces in which sand could accumulate to multiply the sand retained by the system. Finally, no means to direct sand-bearing water into the barriers was taught.

U.S. Pat. Nos. 5,405,217 and 4,966,491 were granted Dias et al. and Sample, respectively for erosion control devices which were capable of filling with sand, to help immobilize these barriers in the presence of waves. While both these designs provided a valley behind a barrier in which to trap sand, they also suffered from the same drawbacks as the previously mentioned designs. Neither of these designs incorporated provisions to prevent sand under a barrier extreme or front from being washed away by wave action. In addition, neither of these designs taught a plurality of terraces in which sand could accumulate to multiply the sand retained by the system. Finally, no means to direct sand-bearing water into the barriers was taught.

DeVries et al. was granted U.S. Pat. No. 5,022,784 for a system which protected shorelines by reducing undertow. The system required the installation of long underground pipes, and the protrusion of intake pipes into the surf zone. This system suffered from complexity, and expensive installation, because most of the underground pipe installation had to be performed underwater. In addition, the intake pipes presented a possible hazard to swimmers in the surf zone, who risked tripping over, or stepping in, the intake pipes.

Bestmann received U.S. Pat. No. 5,338,131 for a shoreline protection system which used plants to stabilize a shoreline. While it is a well-known fact that plants are capable of protecting shorelines and dunes from erosion, their use in a beach environment presents a number of problems. From an aesthetic point of view, sandy beaches are enjoyable to the beach-goer precisely because the beach is free from plants and bushes, and the beach-goer may relax on a beach made up of 100% clean white sand, free of the soil associated with plant growth. In addition, few if any plants are capable of surviving in salt water surf. Finally, even if the plant rolls immobilized by stakes taught by this patent were installable in salt water surf, they would present a hazard to swimmers who might trip over the plant rolls or step on the stakes.

SUMMARY OF THE INVENTION

Accordingly, it is an object of the present invention to provide a beach replenishment system which helps prevent sand from being washed back out to sea. Design features allowing this object to be accomplished include a plurality of V-shaped barriers mutually separated by troughs. Advantages associated with the accomplishment of this object include faster beach replenishment and reduced erosion between barriers.

It is another object of the present invention to provide a beach replenishment system which encourages receding sea water to shoot over sand retained in barrier valleys. Design features allowing this object to be accomplished include barriers having terraces incorporating a land separated from a shoulder by a valley. A benefit associated with the accomplishment of this object is increased sand retention on the barrier.

It is still another object of this invention to provide a beach replenishment system which propels receding water outward from barriers. Design features enabling the accomplishment of this object include barriers incorporating ramps. An advantage associated with the realization of this object is reduced erosion at the base of the barriers.

It is another object of the present invention to provide a beach replenishment system which deflects incoming water sideways into barriers. Design features allowing this object to be accomplished include runout posts disposed opposite troughs. Benefits associated with the accomplishment of this object include preventing incoming water from flowing directly up the troughs, protecting barrier ends from erosion, and deflecting sand-bearing incoming water into the barriers, so the sand may be retained by the barriers.

It is still another object of this invention to provide a beach replenishment system which deflects outgoing water sideways into a position opposite barriers. Design features allowing this object to be accomplished include runout posts disposed opposite troughs. An advantage associated with the realization of this object is the encouragement of sand deposition opposite barriers, where incoming water may wash the sand over barriers for retention in the beach replenishment process.

It is another object of the present invention to provide a beach replenishment system which helps channel incoming sand-bearing water toward vertexes of V-shaped barriers. Design features allowing this object to be accomplished include barrier posts installed opposite barrier vertices. A benefit associated with the accomplishment of this object is increased sand retention by the barriers.

It is still another object of this invention to provide a beach replenishment system which permits sand to be used to stabilize the system. Design features enabling the accomplishment of this object include open-backed V-shaped barriers, and barrier valleys. An advantage associated with the realization of this object is increased barrier stability and immobility in the presence of wave action.

It is yet another object of this invention to provide a beach replenishment system which incorporates posts which are shaped to more efficiently channel incoming sand-bearing water. Design features allowing this object to be achieved include aquadynamic posts having a pair of hydrofoils attached at a knife edge. Benefits associated with reaching this objective include more efficient direction of sand-bearing water into the vertices of the V-shaped barriers, and consequent increased efficiency of sand retention by the beach replenishment system.

BRIEF DESCRIPTION OF THE DRAWINGS

The invention, together with the other objects, features, aspects and advantages thereof will be more clearly understood from the following in conjunction with the accompanying drawings.

Six sheets of drawings are provided. Sheet one contains FIGS. 1 and 2. Sheet two contains FIGS. 3 and 4. Sheet three contains FIGS. 5 and 6. Sheet four contains FIGS. 7 and 8. Sheet five contains FIGS. 9 and 10. Sheet six contains FIGS. 11 and 12.

DETAILED DESCRIPTION OF THE PREFERRED EMBODIMENT

The instant beach replenishment system comprises an array of barriers 2 separated by troughs 36, runout posts 38 installed opposite troughs 36, and barrier posts 72 installed opposite barriers 2. These elements are depicted in FIGS. 1–6 and 9–11.

Figure 1:
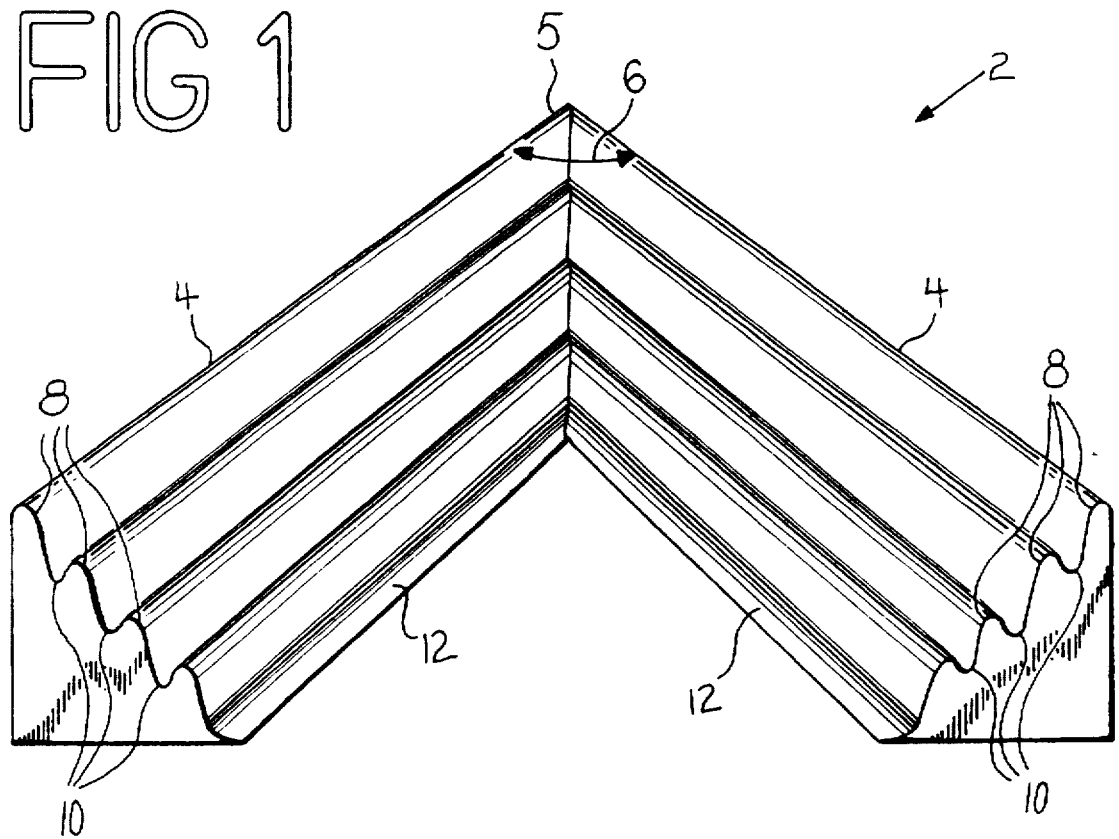
FIG. 1 is a front isometric view of a barrier.
Figure 2:
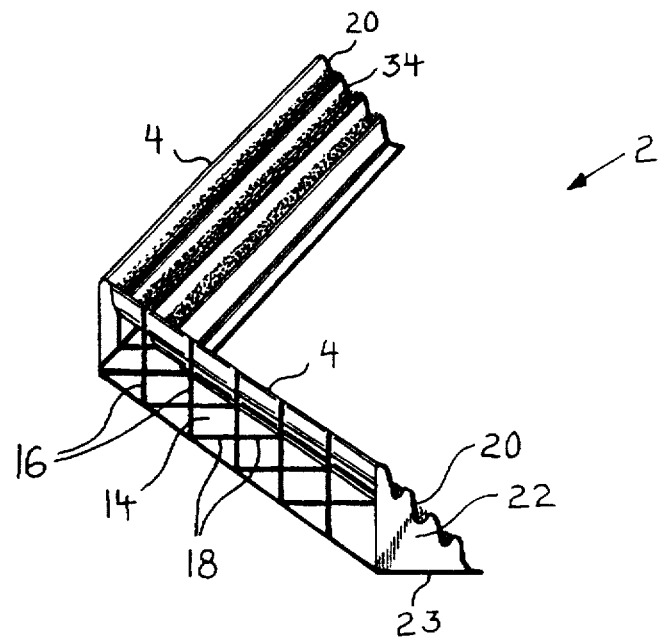
FIG. 2 is a rear quarter isometric view of a barrier.

FIG. 1 is a front isometric view of barrier 2, and FIG. 2 is a rear quarter isometric view of barrier 2. Barrier 2 comprises arms 4 attached at barrier vertex 5 at a barrier arm angle 6. In the preferred embodiment, the optimum value of barrier arm angle 6 was 75 degrees. An extreme 20 of each barrier arm 4 opposite barrier vertex 5 terminates in a barrier arm end wall 22. Barrier arm end wall 22 comprises barrier arm end wall lower edge 23.

Barrier arms 4 comprise a series of parallel descending shoulders 8 mutually separated by parallel valleys 10. Sand-bearing water receding from barrier arm 4 deposits sand 34 within valleys 10, thus helping immobilize barriers 2. Each arm 4 further comprises a ramp 12 attached to the lowest shoulder 8. Parallel shoulders 8 are substantially parallel to ramp 12.

Referring now to FIG. 2, barrier shoulders 8 and valleys 10 are supported by vertical braces 16 and horizontal braces 18. In this fashion, the rear and underside of barrier 2 are largely open. Thus, sand may easily be deposited in the inside 14 of barrier 2, and over horizontal braces 18 and vertical braces 16, thus stabilizing barrier 2 in the presence of waves. In addition, stakes driven into a surface upon which barrier 2 rests may be used to help immobilize barriers 2 and troughs 36.

Figure 3:
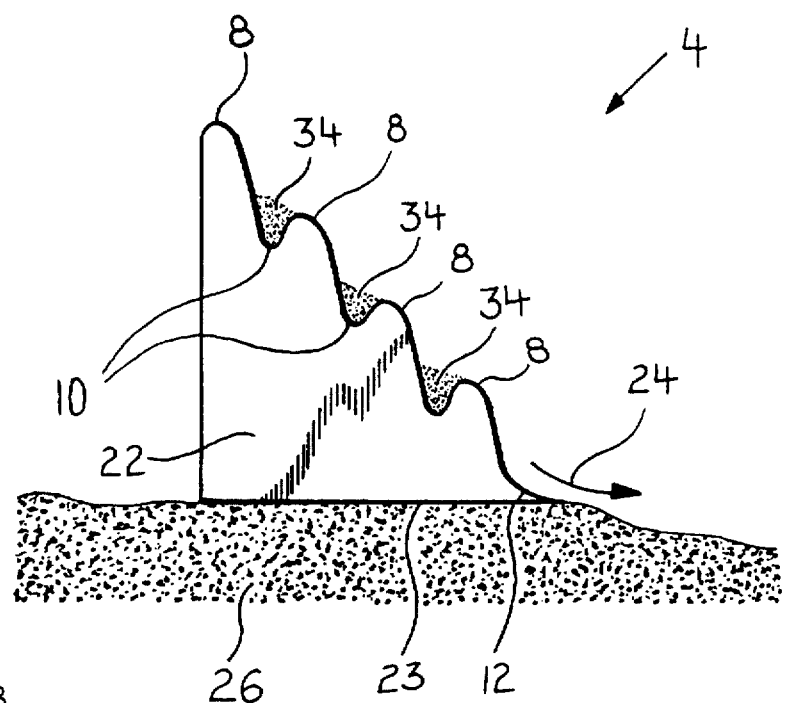
FIG. 3 is an end view of a barrier arm.

FIG. 3 is an end view of barrier arm 4 resting on beach 26 having sand 34. Descending parallel shoulders 8 are mutually separated by parallel valleys 10. The lowest shoulder 8 terminates in ramp 12, which is substantially parallel to shoulders 8. Water receding from barrier 2 is directed outwards from barrier 2 by ramp 12 as depicted by arrow 24, thus minimizing the erosion of sand 34 under barrier 2.

Figure 4:
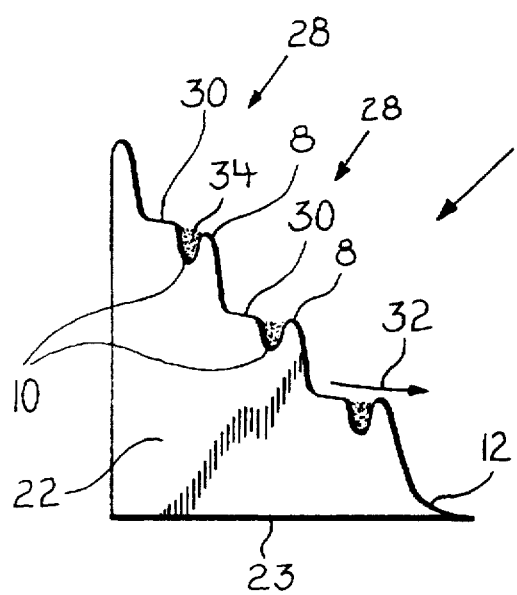
FIG. 4 is an end view of a barrier arm alternate embodiment.

FIG. 4 is an end view of a barrier arm 4 alternate embodiment. Barrier arm 4 comprises a series of parallel descending terraces 28. Each terrace 28 comprises a land 30 separated from a shoulder 8 by a valley 10. Lands 30 are substantially parallel to barrier arm end wall lower edge 23. Sand-bearing water receding from barrier arm 4 deposits sand 34 within valleys 10, thus helping immobilize barriers 2. As water recedes from barrier 2, lands 30 help propel the water over valleys 10 as depicted by arrow 32. In this fashion, receding water is propelled over sand 34 contained within valleys 10 without washing out the sand 34 contained in valleys 10. Thus, sand 34 is retained within valleys 10 even in the presence of receding water.

Figure 5:
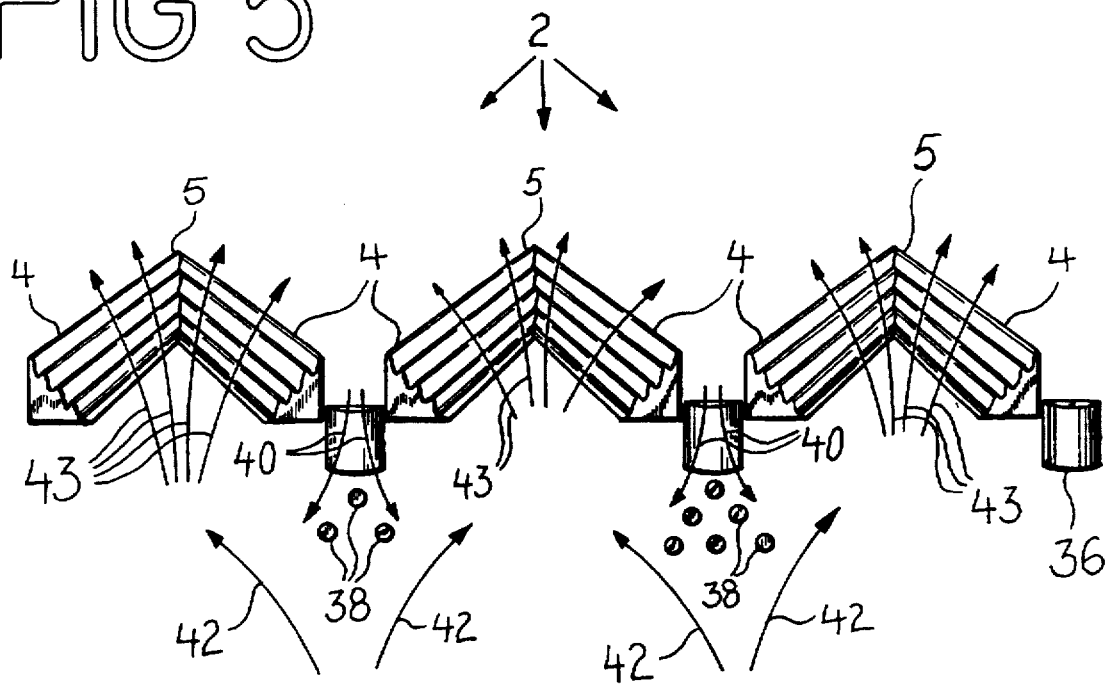
FIG. 5 is a front isometric view of an array of barriers mutually separated by troughs.
Figure 6:
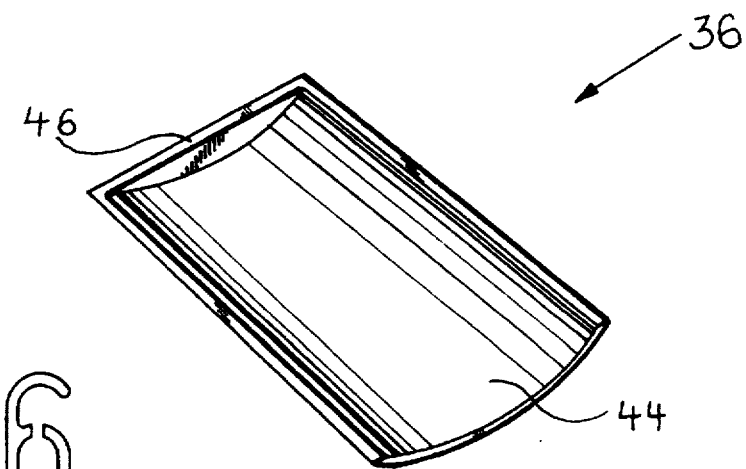
FIG. 6 is a top quarter isometric view of a trough.

FIG. 5 is a front isometric view of an array of barriers 2 mutually separated by troughs 36, and FIG. 6 is a top quarter isometric view of trough 36. Trough 36 comprises trough floor 44 and trough back 46. When installed between barriers 2, troughs 36 help prevent erosion of sand between barriers 2.

Figure 9:
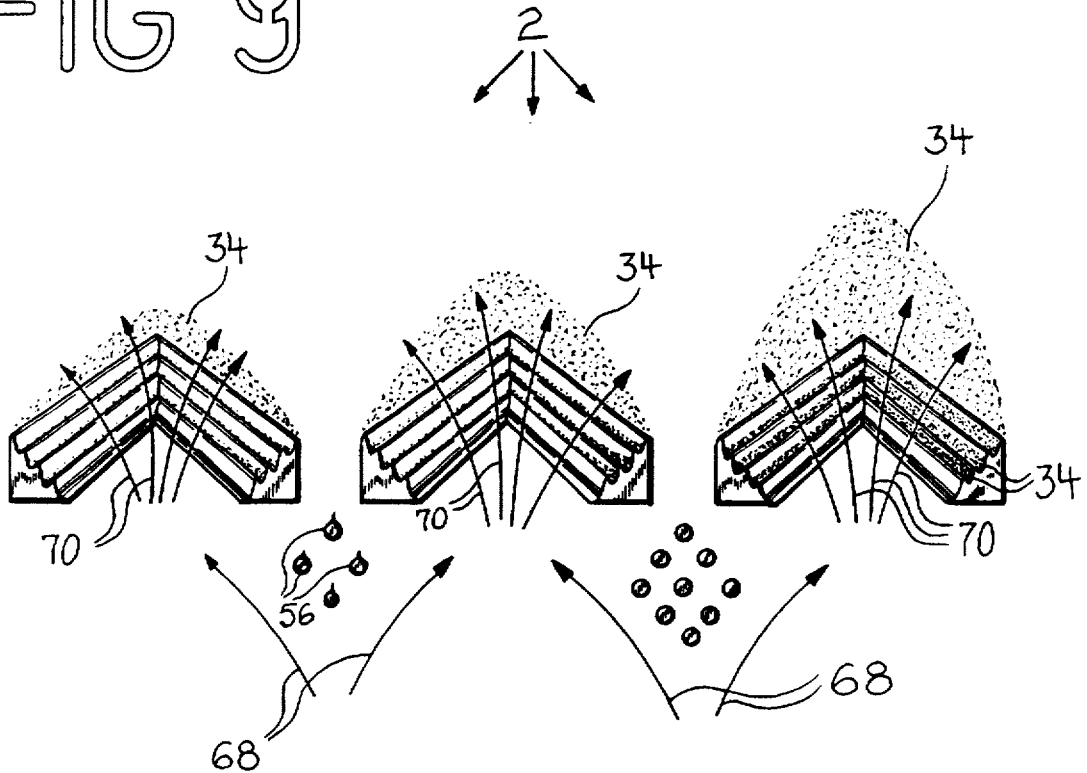
FIG. 9 is a front isometric view of an array of barriers with runout posts installed.

In operation, the instant beach replenishing system rebuilds sandy beaches by using the natural wave action of the sand-bearing water typical of beach shores. Barriers 2, troughs 36, runout posts 38 and barrier posts 72 are emplaced within the surf zone on a beach, where wave action will bring sand over barriers 2. Referring to FIG. 5, sand-bearing waves are directed into and over barrier vertices 5 and barrier arms 4 as indicated by arrows 42 and 43. Sand 34 is deposited within valleys 10 and behind barriers 2, as indicated in FIG. 9. Receding waves are channeled between barriers 2 over troughs 36, as indicated by arrows 40. Troughs 36 serve to minimize sand erosion caused by outgoing water which recedes between barriers 2.

Runout posts 38 serve the dual function of channeling sand bearing waves into barriers 2 as indicated by arrows 42, and also channeling outgoing water opposite barriers 2 as indicated by arrows 40. Runout posts 38 direct sand-bearing waves into barriers 2 as indicated by arrows 42, so that sand borne by such waves will be deposited onto and behind barriers 2, so as to maximize the beach replenishing efficiency of the instant beach replenishment system. Runout posts 38 channel sand-bearing outgoing water into a position opposite barriers 2 as indicated by arrows 40, so that sand borne by such outgoing water will be deposited opposite barriers 2, and thus be in position ready to be entrained by the next incoming wave, and then be borne onto and over barriers 2 as indicated by arrows 43.

Figure 11:
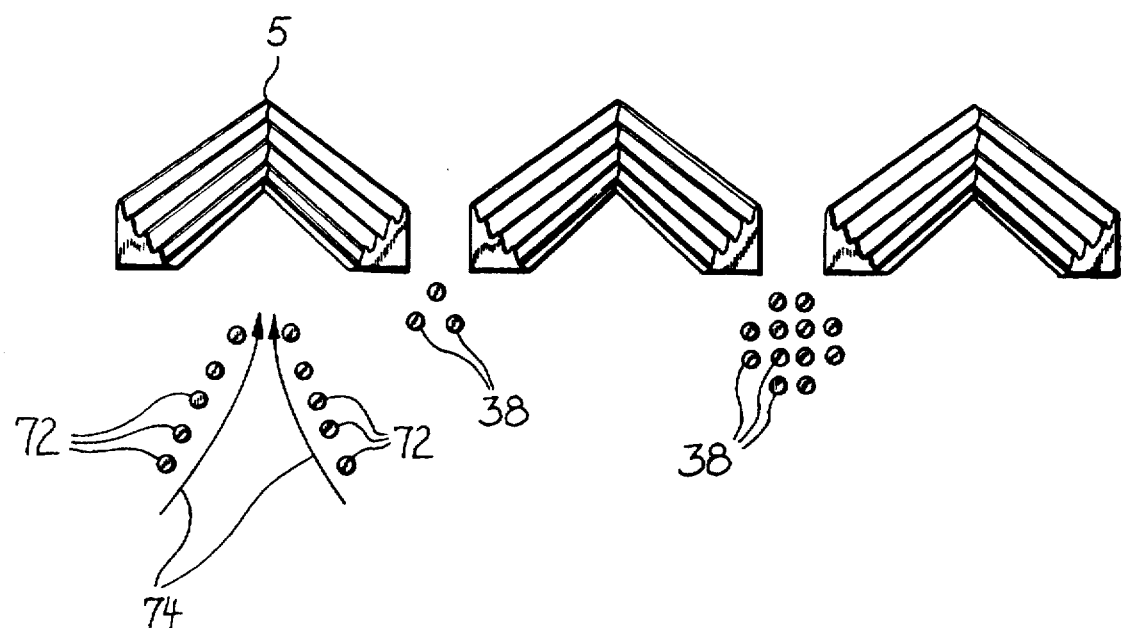
FIG. 11 is a front isometric view of an array of barriers with runout posts and barrier posts installed.

The beach replenishing efficiency of the instant beach replenishment system is further maximized by the emplacement of barrier posts 72 opposite barriers 2 as is depicted in FIG. 11. Barrier posts 72 are disposed on the water side of barriers 2 along the two legs of a "V" whose vertex is barrier vertex 5. Thus, sand bearing waves are channeled toward barrier vertex 5 as indicated by arrows 74. In this fashion, sand-bearing waves are directed onto and over barriers 2, where the sand will be retained within valleys 10 and behind barriers 2 as depicted in FIG. 9.

FIG. 9 depicts an array of three barriers 2 mutually separated by runout troughs 36, with runout posts 38 installed opposite troughs 36. The three barriers 2 in FIG. 9 show sand 34 accumulated behind them, which arrived as indicated by arrows 68 and 70. The left barrier 2 shows sand accumulation which might occur within a month of installation of the instant beach replenishment system; the middle barrier 2 shows sand accumulation which might occur within two months of installation of the instant beach replenishment system, and the right barrier 2 shows sand accumulation which might occur within three months of installation of the instant beach replenishment system.

Figure 10:
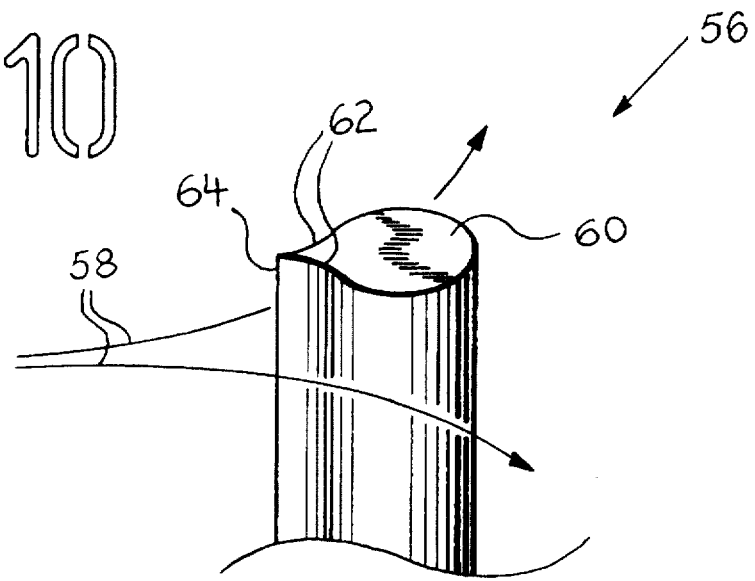
FIG. 10 is a side isometric view of an aquadynamic post.

FIGS. 9 and 10 depict an alternate post embodiment which may be used either as a runout post 38 or as a barrier post 72, the aquadynamic post 56. Aquadynamic post 56 comprises cylindrical aquadynamic post body 60, hydrofoils 62, and knife edge 64. Each hydrofoil 62 is attached to aquadynamic post body 60 at one edge, and to another hydrofoil 62 at the other edge. The attachment of one hydrofoil 62 to another hydrofoil 62 defines knife edge 64. Aquadynamic posts 56 serve to more efficiently channel water than conventional cylindrical posts, because knife edge 64 and hydrofoils 62 serve to direct water as indicated by arrows 58 in FIG. 10. Aquadynamic posts 56 may be positioned with knife edge 64 pointing either toward the shore (as is illustrated in FIG. 9) or toward the ocean.

FIG. 11 is a front isometric view of an array of barriers 2 with runout posts 38 and barrier posts 72 installed. FIGS. 5 and 9 also illustrate alternate array configurations for runout posts 38. Installation configurations for runout posts 38 include the triangular arrays depicted in FIGS. 5 and 11, the diamond-shaped arrays illustrated in FIG. 9, and the octagonal array depicted in FIG. 11.

Figure 7:
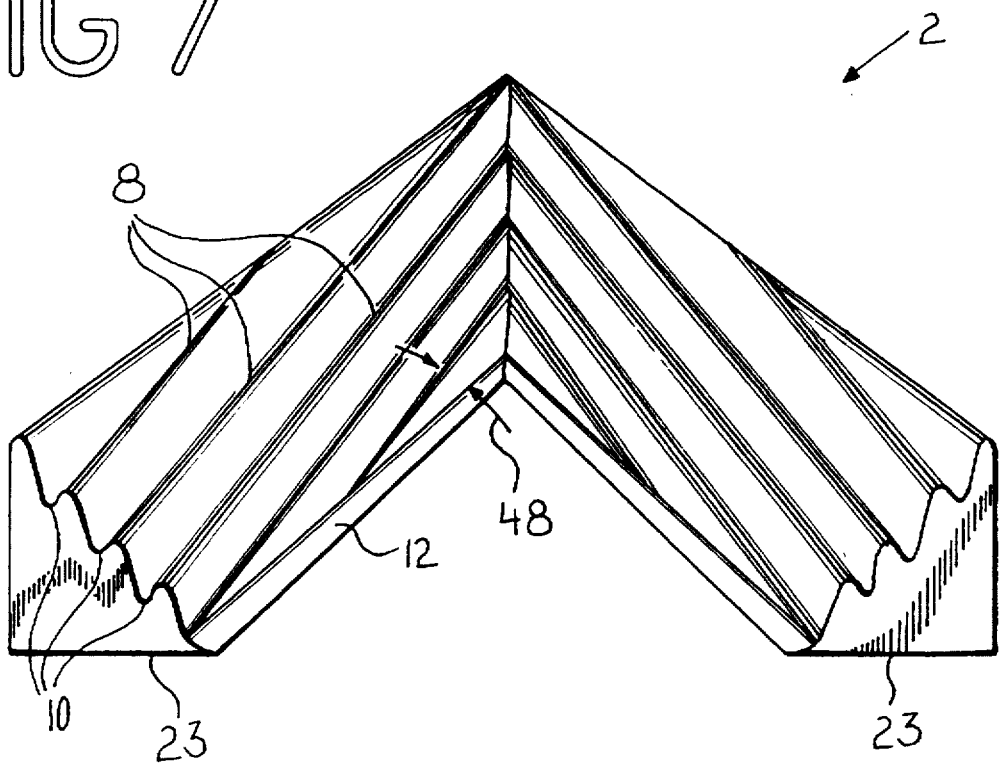
FIG. 7 is a front isometric view of a first alternate embodiment barrier.

FIG. 7 is a front isometric view of a first alternate embodiment barrier 2. This embodiment of barrier 2 comprises a series of parallel shoulders 8 mutually separated by parallel valleys 10. The lowermost shoulder 8 terminates in ramp 12, which as in the preferred embodiment is substantially co-planer with barrier arm end wall lower edges 23. Shoulders 8 and valleys 10 are oriented at a shoulder angle 48 relative to ramp 12. In the preferred embodiment, shoulder angle 48 was 20 degrees. The purpose of the angle between valleys 10 and ramp 12 is to more closely align the direction of valleys 10 with incoming sand-bearing waves, and thus to facilitate and increase the deposition of sand 34 within valleys 10.

Figure 8:
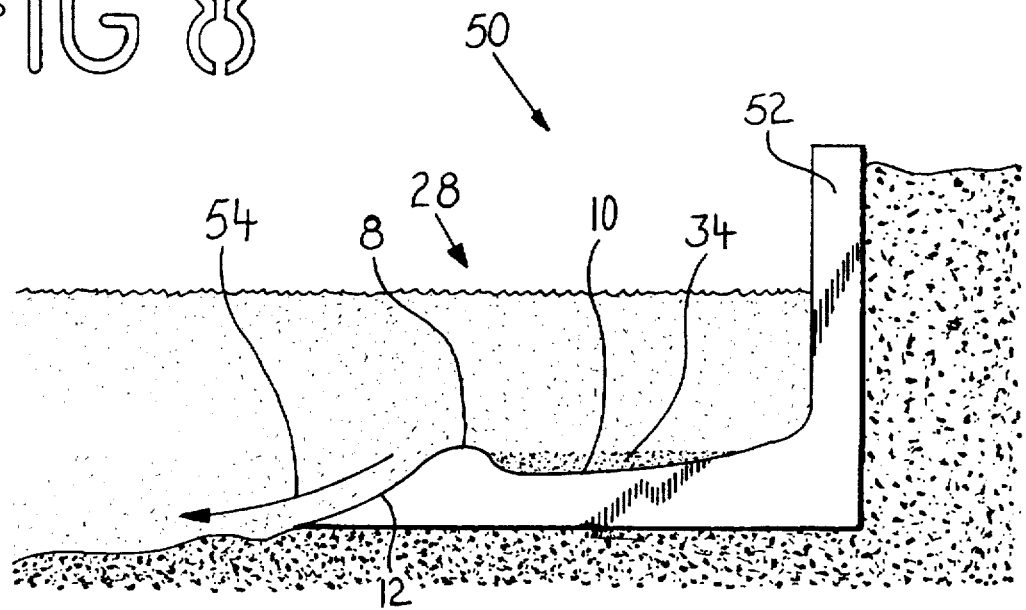
FIG. 8 is an end view of a second alternate embodiment of a barrier.

FIG. 8 is an end view of a second alternate embodiment of a barrier, seawall 50. Seawall 50 comprises a single terrace 28 bordered on one side by wall 52 and on the other side by ramp 12. Wall 52 is rigidly attached to terrace 28 at a substantially right angle. Terrace 28 comprises valley 10 adjacent wall 52, and shoulder 8 adjacent ramp 12. Wall 52 serves as a seawall which protects a shoreline on which seawall 50 is installed. Ramp 12 serves to direct receding water is away from seawall 50 as indicated by arrow 54, thus minimizing sand erosion from under seawall 50.

Figure 12:
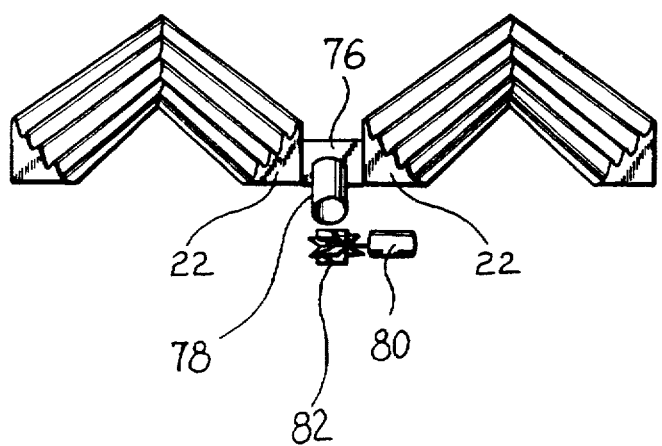
FIG. 12 is a front isometric view of an array of barriers with a generator installed.

FIG. 12 is a front isometric view of an array of barriers 2 with generator 80 installed. Receding water is channeled through pipe 78 by means of barriers 2, barrier arm end walls 22 and dam 76. Water exiting pipe 78 turns turbine 82, to which generator 80 is attached. In this manner natural wave action may be employed to generate electricity.

In the preferred embodiment, barriers 2, troughs 36, dam 76 and pipe 78 were manufactured of fiberglass, concrete, or other appropriate material. Posts 38 and 72 were made of concrete, wood, or other appropriate material.

While a preferred embodiment of the invention has been illustrated herein, it is to be understood that changes and variations may be made by those skilled in the art without departing from the spirit of the appending claims.

DRAWING ITEM INDEX 2 barrier
4 barrier arm
5 barrier vertex
6 barrier arm angle
8 shoulder
10 valley
12 ramp
14 inside
16 vertical brace
18 horizontal brace
20 arm extreme
22 barrier arm end wall
23 barrier arm end wall lower edge
24 arrow
26 beach
28 terrace
30 land
32 arrow
34 sand
36 trough
38 runout post
40 arrow
43 arrow
42 arrow
44 trough floor
46 trough back
48 shoulder angle
50 seawall
52 wall
54 arrow
56 aquadynamic post
58 arrow
60 aquadynamic post body
62 hydrofoil
64 knife edge
68 arrow 70 arrow
72 barrier post
74 arrow
76 dam
78 pipe
80 generator
82 turbine

I claim:

1. A beach replenishment system comprising at least one barrier, each said at least one barrier comprising a series of descending terraces, each said terrace comprising a valley adjacent a shoulder, a cross-sectional shape of each said shoulder being a smooth curve whose ends blend smoothly with cross-sectional shapes of adjacent barrier structure, whereby sand-bearing water may deposit sand within said valleys, each said at least one barrier comprising two arms mutually attached at a barrier vertex, an intersection of said arms forming a barrier arm angle, barrier arm end walls at an extreme of each said arm opposite said barrier vertex, vertical braces supporting said barrier arms, and horizontal braces supporting said barrier arms, each said barrier arm end wall comprising a barrier arm end wall lower edge, whereby drifting sand may fill an interior of said barrier, thus immobilizing said barrier against waves.

2. A beach replenishment system comprising at least one barrier, each said at least one barrier comprising a series of descending terraces, each said terrace comprising a valley adjacent a shoulder, a cross-sectional shape of each said shoulder being a smooth curve whose ends blend smoothly with cross-sectional shapes of adjacent barrier structure, whereby sand-bearing water may deposit sand within said valleys, each said terrace comprising a land separated from said shoulder by said valley, each said land being substantially parallel to a surface upon which said barrier rests, whereby water receding from said barrier will be projected over said valley, thus preventing sand deposited within said valleys from being washed away by the receding water.

3. The beach replenishment system of claim 2 comprising at least two barriers separated by a trough, said trough comprising a trough floor and a trough back, whereby erosion between said barriers caused by receding water will be minimized.

4. A beach replenishment system comprising at least two barriers separated by a trough comprising a trough floor and a trough back, each said barrier comprising a series of descending terraces, each said terrace comprising a valley adjacent a shoulder, a cross-sectional shape of each said shoulder being a smooth curve whose ends blend smoothly with cross-sectional shapes of adjacent barrier structure, whereby sand-bearing water may deposit sand within said valleys, runout posts installed opposite said trough, whereby incoming sand-bearing water will be channeled into said barriers, and whereby outgoing water will be channeled opposite said barriers.

5. The beach replenishment system of claim 4 wherein said runout posts are installed in a triangular array.

6. The beach replenishment system of claim 4 wherein said runout posts are installed in a diamond-shaped array.

7. The beach replenishment system of claim 4 wherein said runout posts are installed in an octagonal array.

8. The beach replenishment system of claim 4 wherein said runout posts are aquadynamic posts comprising an aquadynamic post body and two hydrofoils, said hydrofoils being mutually attached at a knife edge, each said hydrofoil being attached to said aquadynamic body at an edge opposite said knife edge, whereby water directing capability of said aquadynamic post is increased.

9. The beach replenishment system of claim 2 further comprising barrier posts installed opposite each said barrier, the barrier posts associated with a given barrier being installed along two straight lines, extensions of said lines intersecting in said given barrier.

10. The beach replenishment system of claim 2 wherein said shoulders are mutually parallel and said valleys are parallel to said shoulders, said shoulders being oriented at a shoulder angle relative to said ramp.

11. The beach replenishment system of claim 10 wherein said shoulder angle is twenty degrees ± five degrees.

12. A beach replenishment system comprising a plurality of barriers mutually separated by troughs, each said barrier comprising two arms mutually attached at a barrier arm angle, the intersection of said barrier arms defining barrier vertex, each said arm comprising a series of descending terraces, each said terrace composing a shoulder and a valley, a cross-sectional shape of each said shoulder being a smooth curve whose ends blend smoothly with cross-sectional shapes of adjacent barrier structure, said shoulders being mutually parallel and mutually separated by said valleys, said lowest shoulder bordering a ramp, said ramp being substantially parallel to a surface upon which said barrier rests, runout posts installed opposite said troughs, and barrier posts, installed opposite each said barrier, the barrier posts associated with a given barrier being installed along two straight lies, extensions of said lines intersecting at a midpoint of said given barrier.

13. The beach replenishment system of claim 12 wherein each said arm further comprises a barrier arm end wall at an extreme of each said arm opposite said barrier vertex, and wherein said beach replenishment system further comprises a dam attached at two edges to said barrier arm end walls, a pipe communicating through said dam, and turbine attached to a generator disposed at an outlet of said pipe, whereby electricity may be generated by receding water emerging from said pipe.

14. A beach replenishment system comprising at least two barriers separated by a through and at least one runout post installed opposite said trough, each at least two barriers comprising a series of descending terraces, each said terrace comprising a valley adjacent a shoulder, a cross-sectional shape of each said shoulder being a smooth curve whose ends blend smoothly with cross-sectional shapes of adjacent barrier structure, whereby sand-bearing water may deposit sand within sand valleys, each said terrace comprising a land separated from said shoulder by said valley, each said land being substantially parallel to a surface upon which said barrier rests, whereby water receding from said barrier will be projected over said valley, thus preventing sand deposited within said valley from being washed away by the resending water, and each said least two barriers comprising two arms mutually attached at a barrier vertex, an intersection of said arms forming a barrier arm angle.

15. The beach replenishment system of claim 14 wherein a lowest said shoulder is bordered by a ramp, said ramp being substantially parallel to a surface upon which said barrier rests, whereby water receding from said barrier is channeled outwards away from said barrier, thus minimizing erosion under said barrier.

16. The beach replenishment system of claim 14 wherein said barrier arm angle is 75 degrees±10 degrees.

17. The beach replenishment system of claim 14 wherein said runout posts are aquadynamic posts comprising an aquadynamic post body and two hydrofoils, said hydrofoils being mutually attached at a knife edge, each said hydrofoil being attached to said aquadynamic body at an edge opposite said knife edge, whereby water directing capability of said aquadynamic posts is increased.

18. The beach replenishment system of claim 14 further comprising barrier arm end walls at an extreme of each arm opposite said barrier vertex, vertical braces supporting said barrier arms, and horizontal braces supporting said barrier arms, each said barrier arm end wall comprising a barrier arm end wall lower edge, whereby drifting sand may fill an interior of said barrier, thus immobilizing said barrier against waves.

* * * * *